US009215081B2

(12) United States Patent
Singh et al.

(10) Patent No.: US 9,215,081 B2
(45) Date of Patent: Dec. 15, 2015

(54) MULTICAST SMART LEAVE TECHNOLOGIES

(75) Inventors: Ranpreet Singh, Mohali (IN); Abhinesh Mishra, Bareilly (IN)

(73) Assignee: Infosys Limited, Bangalore (IN)

( * ) Notice: Subject to any disclaimer, the term of this patent is extended or adjusted under 35 U.S.C. 154(b) by 861 days.

(21) Appl. No.: 13/491,458

(22) Filed: Jun. 7, 2012

(65) Prior Publication Data

US 2013/0250950 A1 Sep. 26, 2013

(30) Foreign Application Priority Data

Mar. 22, 2012 (IN) .......................... 1046/CHE/2012

(51) Int. Cl.
*H04L 12/18* (2006.01)
*H04L 12/801* (2013.01)

(52) U.S. Cl.
CPC .............. *H04L 12/185* (2013.01); *H04L 12/18* (2013.01); *H04L 47/12* (2013.01)

(58) Field of Classification Search
CPC .................................................... H04L 12/185
See application file for complete search history.

(56) References Cited

U.S. PATENT DOCUMENTS

| 6,826,612 | B1 | 11/2004 | Bosloy et al. |
| 7,359,939 | B2 | 4/2008 | Poulsen et al. |
| 7,886,058 | B2 | 2/2011 | Bosloy et al. |
| 2003/0145102 | A1 | 7/2003 | Keller-Tuberg |
| 2006/0029078 | A1* | 2/2006 | Lu et al. ..................... 370/395.2 |
| 2008/0112324 | A1* | 5/2008 | Li et al. .......................... 370/235 |
| 2009/0175272 | A1* | 7/2009 | Hedaoo et al. ................ 370/390 |
| 2010/0316050 | A1 | 12/2010 | Baykal et al. |
| 2013/0101071 | A1* | 4/2013 | Salinger ........................ 375/320 |

OTHER PUBLICATIONS

Fenner, "Internet Group Management Protocol, Version 2," RFC 2236, downloaded from http://cabernet.tools.ietf.org/html/rfc2236, 25 pages (Nov. 1997).

Shoaf et al., "Introduction to IGMP for IPTV Networks," Juniper Networks, downloaded from https://www.apac-juniper.net/juniper_public/campaign/pdf/iptv/sc/200188.pdf, 18 pages (copyright Jun. 2006).

* cited by examiner

*Primary Examiner* — Omer S Mian
(74) *Attorney, Agent, or Firm* — Klarquist Sparkman, LLP (57) ABSTRACT

Smart leave technology for the Internet Group Management Protocol (IGMP) can reduce the amount of network bandwidth consumed by unintended multicast traffic resulting from a "lost leave" situation. A network device (such as a residential gateway) positioned between a host and an upstream router, upon receipt of unintended multicast traffic, sends a leave message to the router informing the router that the network device in no longer part of the group. The network device drops the uninterested multicast traffic and starts a countdown timer. Upon expiration of the timer, the network device sends another leave command to the router and starts the timer anew. This process repeats as long as unintended multicast traffic is received at the network device. If a host downstream from the network device joins the unintended multicast group, the network device delivers any subsequent packets associated with the multicast group to the host.

20 Claims, 6 Drawing Sheets

MULTICAST SMART LEAVE TECHNOLOGIES

BACKGROUND

Internet Protocol Television (IPTV) delivers television services to host devices via a multicast routing scheme. The Internet Group Multicast Protocol (IGMP) is used for managing IPTV multicast groups. Using IGMP messages, host devices (such as set top boxes) can begin or discontinue receiving particular IPTV services by joining or leaving the corresponding IPTV multicast group. IGMP is used to manage multicast group memberships.

SUMMARY

This Summary is provided to introduce a selection of concepts, in a simplified form, that are further described hereafter in the Detailed Description. This Summary is not intended to identify key features or essential features of the claimed subject matter nor is it intended to be used to limit the scope of the claimed subject matter.

"Smart leave" techniques and tools are described herein that allow for a network device, such as a residential gateway (e.g., a router, a DSL modem, a cable modem), to reduce the flow of multicast traffic to host devices no longer wishing to receive traffic from that particular group. This flow of unintended multicast traffic can result from a "lost leave" situation in which a leave message sent from a host device, such as a set top box, to an upstream router is never received by the router or the router is unable to process the leave message for some reason. The router, not having received or processed the leave message, still thinks that the host is a member of the multicast group and continues to deliver multicast traffic for that group to the host device.

In one embodiment, a residential gateway, upon receiving unintended multicast traffic, sends a leave message to the upstream router indicating that the gateway is no longer a member of the group associated with the traffic. The unintended multicast traffic is dropped by the gateway and not passed along to any downstream host devices. The gateway can start a countdown timer set for a specified amount of time (e.g., 10 seconds) and reissue the leave command to the router if it continues to receive unintended multicast traffic after the timer has expired. This process repeats as long as unintended multicast traffic is received at the router. Once a host downstream from the router joins the multicast group, the gateway allows multicast traffic associated with the group to flow to the host.

The foregoing and other objects, features and advantages of the invention will become more apparent from the following detailed description, which proceeds with reference to the accompanying figures.

DETAILED DESCRIPTION

Internet Protocol Television

Internet Protocol Television (IPTV) is a system by which television services are delivered to host devices using the Internet Protocol (IP) over a packet-switched network, such as the Internet. IPTV uses IP multicast (a one-to-many and many-to-many routing scheme) to deliver television services to host devices.

Figure 1:
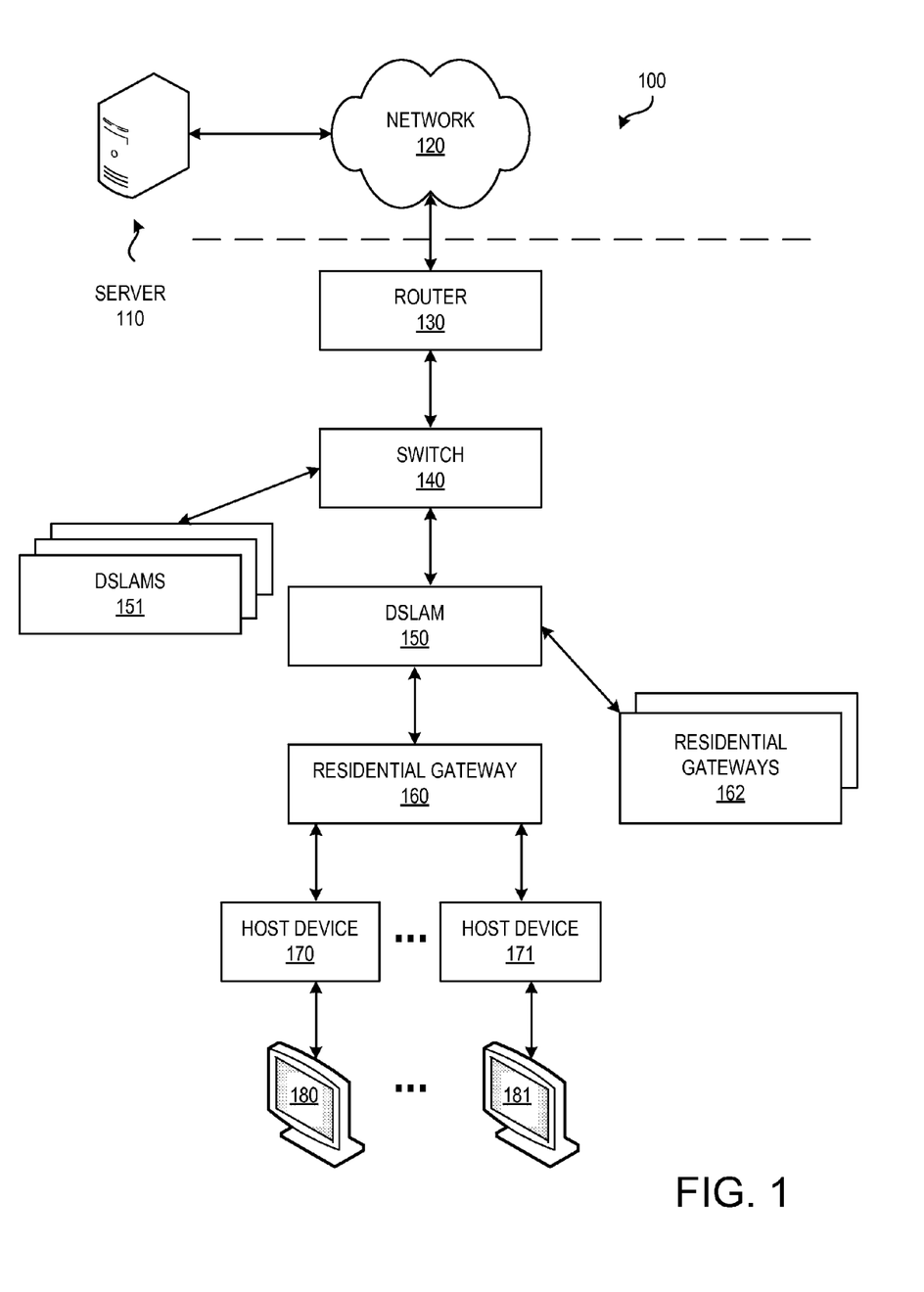
FIG. 1 is a diagram of an exemplary IPTV network.

FIG. 1 is a diagram of an exemplary IPTV network 100. The network 100 comprises a server 110 that distributes IPTV services (e.g., video) to host devices 170-171 via IP multicasting. The server 110 can be, for example, part of a television head-end that encodes and delivers live television channels in the form of IP multicast streams. The server 110 sends IPTV packets to a network 120, such as a backbone, WAN or the Internet. The packets arrive at a router 130 after passing through the network 120. The router can be, for example, an edge router than connects the network 120 to a smaller, local network such as a LAN or a local DSL distribution system. The router 130 delivers the packets comprising the IP multicast streams to a switch 140, such as an Ethernet switch. In network 100, the packets are delivered along the last mile to a residence via Digital Subscriber Line (DSL) technology, and the switch 140 connects to a DSL Access Multiplexer (DSLAM) 150. The switch 140 also connects to additional DSLAMs 151, allowing for the aggregation of multicast request from additional hosts (not shown). In other embodiments, the network 100 can use other technologies or infrastructure to distribute IPTV services, such as cable television infrastructure, satellites or fiber network.

The DSLAM 150 connects DSL lines from a residential gateway 160 and additional gateways 161 to the switch 140. The residential gateway is typically a home network device, such as a DSL modem, which can have wired and/or wireless routing capabilities to connect to multiple host devices, such as host devices 170-171. In embodiments where IPTV services are provided to the home using the cable television infrastructure, the residential gateway 160 can be a cable modem. In other embodiments, the residential gateway can be a network switch or a wireless access point. Although a residential gateway is shown in FIG. 1, the gateway need not be residential in nature and can be a commercial modem and/or router for use in business, academic or other environments.

The host devices 170-171 deliver IPTV content received from the gateway 160 to display devices 180-181, such as televisions, video monitors and the like. The host devices can be set top boxes or any other device capable of receiving a signal from a residential gateway and delivering the signal to a display device. For example, host devices 170-171 can be any IPTV-enabled device such as a laptop, desktop, smartphone or other device capable of communicating with the gateway 160 and comprising (or in communication with) a display device 180-181.

Although the network 100 is shown with two layers of aggregation between the host devices 170-171 and the router 130 (i.e., the DSLAM 150 and the switch 140), there can be more or fewer layers of aggregation between these devices. For example, in some embodiments, the DSLAM 150 can communicate directly with the router 130.

IP Multicast and Internet Group Management Protocol (IGMP)

As mentioned, IPTV uses IP multicast to distribute content to host devices. IP multicast is a routing scheme in which packets are delivered from a source (e.g., server 110) to one or more receivers (e.g., host devices 170-171) through a multicast distribution tree. The distribution tree is assembled by network elements (e.g., routers, switches) located between the source and the receivers, with multicast packets being sent once along any given branch of the tree. IPTV traffic associated with a particular television source (or other content) is sent by a source to an IP address associated with a particular multicast group. A receiver informs the IPTV system that it wishes to receive IPTV content by issuing a join message to the IPTV system indicating which multicast group(s) the host wishes to belong. A host can discontinue receiving IPTV content by issuing a leave message to leave a multicast group.

The Internet Group Management Protocol (IGMP) is used for managing multicast group membership in IPTV systems. The IGMP commands discussed herein are described in the context of IGMPv3, but the smart leave technologies described herein can also be implemented in IGMPv2.

Figure 2A:
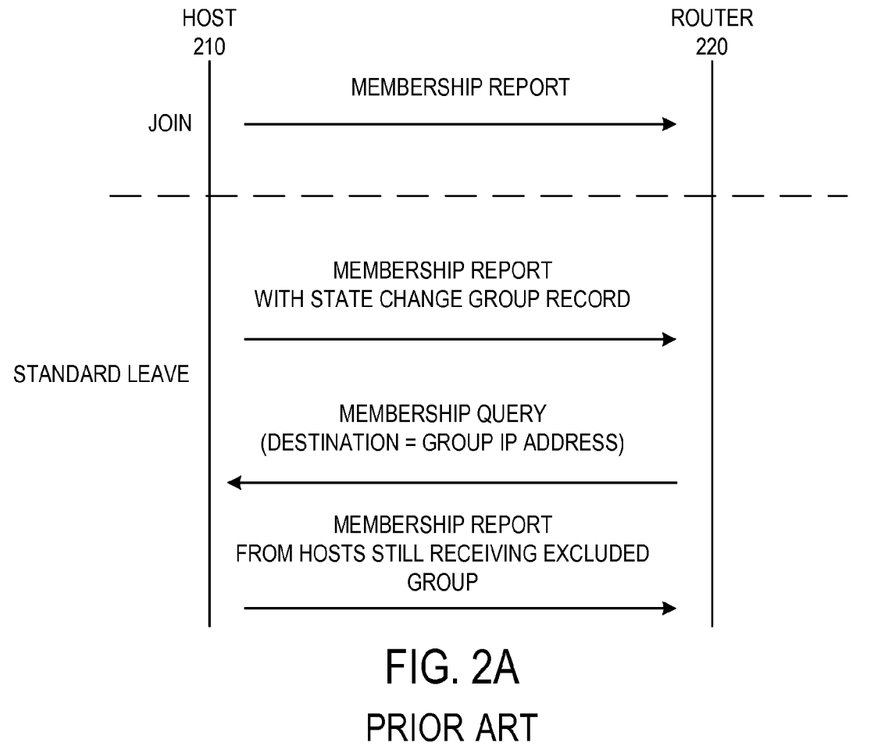
FIG. 2A illustrates IGMP join and leave commands.
Figure 2B:
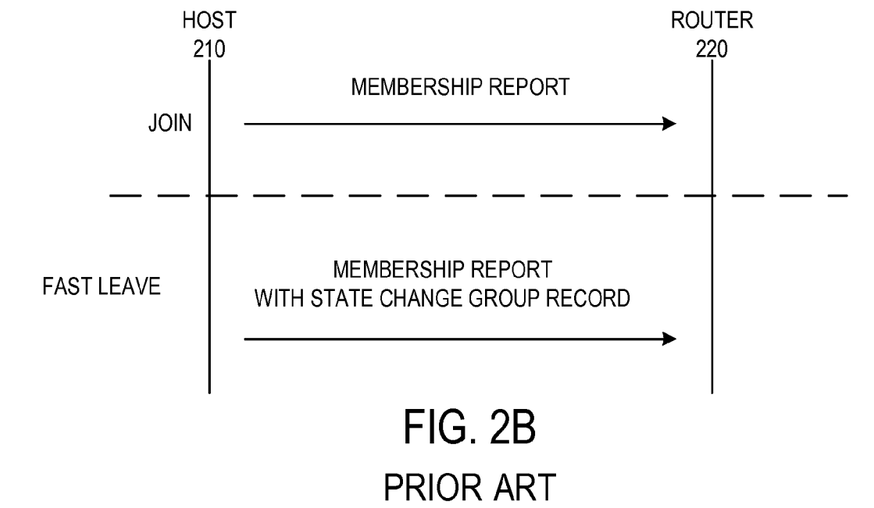
FIG. 2B illustrates IGMP join and leave commands with fast leave.

FIG. 2A and FIG. 2B illustrate IGMPv3 join and leave commands. The join command comprises a host 210 sending an unsolicited membership report to a router 220. The membership report includes the address of the multicast group that the host wishes to join. A host can join multiple groups by including multiple addresses in the membership report. Upon receiving the membership report, the router 220 determines whether the multicast group to be joined is currently being provided to the router interface to which the host 210 is connected. If not, the router 220 determines that the multicast group is one which now has a member, and passes packets associated with the multicast group to the host. If the multicast group is already being delivered, the router adds the host to the list of hosts receiving that multicast group.

Two leave commands are supported by IGMP3, a standard leave command and a fast (or immediate) leave command. FIG. 2A and FIG. 2B illustrate the two leave commands. The smart leave technologies described herein address "lost leave" conditions arising from either leave command as either the standard or fast leave commands can be dropped or become corrupted after or before reaching the router. With reference to FIG. 2A, the standard leave message comprises the host 210 sending a membership report to the router 220 containing a Change State record that excludes the address of a group that the host wishes to leave. Alternatively, the host 210 can send a membership report containing the addresses of multicast groups that the host 210 wishes to leave. In response, the router 220 sends a membership query on the corresponding interface to the downstream hosts to determine whether any of the downstream hosts still are to receive the multicast group. If the router 220 receives no responses, the router 220 no longer delivers multicast traffic associated with the multicast group left by the host. The fast leave functionality is a variation of the standard leave. In general, a fast leave differs from a standard leave in that the router 220 does not send a group specific membership query to downstream hosts after receiving a leave message, as shown in FIG. 2B.

A fast leave can be used in various scenarios. In a first scenario, a router (or other network device) can use a fast leave when there is only one host on a given network segment downstream from the router. In this case, the router does not send a membership query to determine how many downstream hosts are members of the group, as the router has just received a leave message from the only downstream host. In a second scenario, a router can use a fast leave when there are multiple hosts on a given network segment and the router keeps track of which hosts belong to which groups. Thus, when the host receives a leave command from the last host belong to a multicast group, the router knows this fact, and ceases passing along multicast traffic for that group until at least one host rejoins the group.

The IGMPv3 join and leave commands are referred to as "commands" or "messages" herein, for the sake of convenience, even though they can comprise more than one message or command being sent between the host and the router. For example, the standard leave commands comprise at least two messages, a membership report and a membership query. As used herein, the sending of an IGMPv3 command refers to the first message being sent between a host and a router, unless otherwise noted. Thus, a host sending a join or leave message to an upstream router refers to the host sending the appropriate membership report to the router. In addition, the terms IPTV traffic, IPTV multicast traffic, IPTV content and variations of these terms refer to IPTV data packets, the IPTV packets that include IPTV content or payload used to generate media output at a display or other output device. Data packets are distinguishable from control packets in that they do not contain IPTV content or payload. Packets associated with IGMP membership reports and membership queries are examples of control packets.

Typically, the router 220 acts as a gateway from the "last mile" to a residence to a backbone of an IPTV network, a WAN or other (typically larger) network. However, any of the network devices between the hosts 170-171 (i.e., the switch 140, the DSLAM 150 or the residential gateway 160), and other network types not shown in FIG. 1 can act as the router 220 if such devices are configured to act as an IGMP proxy. IGMP proxies can behave as both a router 220 and a host 210. For example, with reference to FIG. 1, the residential gateway 160 acting as an IGMP proxy can act as a router to the host devices 170-171, and as a host to the router 130.

Although an IGMP leave command is intended to halt the distribution of IPTV traffic to hosts that are not members of the associated multicast group (if no other hosts on the same link remain members), unintended multicast traffic can continue to flow if the leave message never arrives at the upstream router or is corrupted upon arrival. The leave message can be dropped for various reasons, such as network congestion or a portion of the network operating in a noisy environment. This situation is known as a "lost leave" scenario and can result in unintended multicast traffic needlessly consuming network bandwidth. If the host device has changed IPTV channels (i.e., has joined a new IPTV multicast group after issuing the leave command), the network can drive more IPTV traffic to the host than the network can handle. The link between host devices and the residential gateway can be particularly impacted. Although a router typically issues a membership query to downstream host devices on a periodic basis to keep its multicast membership records current, which typically resolves a lost leave problem, it can take several minutes for this periodic query to occur. Thus, until the flow of unintended multicast traffic is halted, a user could see a degraded IPTV program at a display such as a blank screen, missing pixels or corrupted video and/or audio.

As used herein, the term "unintended multicast group" refers to a multicast group which, from the perspective of a particular network device, no host downstream from the network device is a member. The terms "unintended multicast traffic" and "unintended multicast packets" refer to multicast traffic and packets associated with an uninterested multicast group. The term "uninterested host" refers to a host that is not a member of a particular multicast group.

The term "intended multicast group" refers to a multicast group which, from the perspective of a particular network device, has at least one host device downstream from the network device as a member. The terms "intended multicast traffic" and "intended multicast packets" refer to multicast traffic and packet associated with an interested multicast group. The term "interested host" refers to a host that belongs to an indicated multicast group.

EXAMPLE 1

Exemplary IGMP Smart Leave

In any of the embodiments described herein, a network device can be configured to perform a "smart leave" to reduce the flow of unintended multicast traffic to downstream hosts.

In conventional implementations, residential gateways perform layer 2 MAC (Media Access Control) address filtering on received multicast traffic to control traffic flow. If the gateway receives uninterested multicast packets, the packets are dropped at the data link layer (layer 2 in the OSI (Open Systems Interconnection) model).

In some embodiments, the lost leave problem is addressed by configuring the gateway (or other network device) to process the multicast packets at the network layer (layer 3 of the OSI), rather than performing layer 2 MAC address filtering. The residential gateways are configured to keep track of the multicast groups that have at least one interested downstream host, and the uninterested multicast groups for which the gateway has recently received associated traffic (due to a lost leave situation).

If the gateway receives uninterested multicast traffic, it issues a leave message to the upstream router to leave the uninterested multicast group and drops the received traffic. That is, the gateway does not deliver the uninterested traffic to downstream host devices. The gateway can determine that a multicast packet is not to be passed to any downstream hosts by checking the multicast group associated with the packet against a list of multicast groups that have at least one downstream host as a member. One embodiment of such a list, a group validity table, is described in detail below.

Issuance of the leave message typically results in the flow of uninterested traffic to cease. The gateway keeps track of this uninterested multicast group for a specified period of time. Once the specified period of time has elapsed, the gateway no longer keeps track of the uninterested multicast group. If unintended multicast traffic is subsequently received by the gateway, the process is repeated. That is, the gateway reissues the leave command, keep track of the unintended multicast group for a specified period of time, and drop packets associated with the uninterested multicast traffic. The process is repeated as long as unintended multicast traffic is received at the gateway.

The gateway keeps track of uninterested multicast groups for a specified time so that it does not flood the upstream network with leave commands. Many uninterested multicast packets may be received at the gateway before the router processes the leave command and stops sending uninterested multicast traffic or the leave message may never have arrived. In some embodiments, this time is set to 10 seconds, but other times can be used. The specified time can be configurable and can be static or dynamic. In the latter case, the gateway can dynamically configure the time based on network performance. For example, if the gateway determines that uninterested multicast traffic is still being received for a majority of the specified time interval, the gateway can reduce the interval so that it sends leave messages more frequently.

EXAMPLE 2

Exemplary Group Validity Table

In any of the examples described herein, a network device configured with smart leave technology can maintain a group validity table to keep track of interested and uninterested multicast groups. In one embodiment, a group validity table comprises one or more group validity entries, which can be a GroupValidity structure defined as follows:

```
typedef struct GroupValidity {
    IPAddress   Group_Address;   /* IP Address of the Group */
    String      Interested;      /*Yes: interested Group,
                                   No: non-interested Group */
    Uint        Timer;           /* Configurable timer for
                                   tuning periodic smart leave*/
} GroupValidity;
```

The GroupValidity structure has three fields: IPAddress (the IP address of a multicast group), Interested (a Boolean variable indicating whether the multicast group is an interested group) and Timer (indicating the amount of time that an uninterested group entry remains in the group validity table and the minimum amount of time that passes before the network device issues another leave message). In some embodiments, the group validity table can comprise additional fields.

A network device configured to maintain a group validity table, at some point after receiving commands from downstream hosts to join multicast groups associated with IP address 239.0.0.1, 239.0.0.2 and 239.0.0.3, could have a group validity table with the following contents:

| Group Address | Interested | Timer |
|---|---|---|
| 239.0.0.1 | Yes | NA |
| 239.0.0.2 | Yes | NA |
| 239.0.0.3 | Yes | NA |

The "NA" value for the Timer variable indicates that the timer is not assigned for interested groups.

If one of the downstream hosts sends a leave command to the network device to leave multicast group 239.0.0.3, and this particular host is the only host downstream from the network device that is a member of this group, the associated group entry will be removed the table. Typically, the network device keeps track of additional information about interested multicast groups in order to determine whether a host sending a leave command is the last host to leave a multicast group. The additional information can comprise, for example, identifying information about each host that belong to a group, the number of downstream hosts belonging to a group and the like. In some embodiments, this additional information can be included in the group validity table. After removal of the 239.0.0.3 entry, the group validity table can have the following contents:

| Group_Address | Interested | Timer |
|---|---|---|
| 239.0.0.1 | Yes | NA |
| 239.0.0.2 | Yes | NA |

Multicast packets received by the network device are processed by the network device at level 3 to determine whether the received multicast packets are associated with an uninterested multicast group. Determining that the multicast group associated a received packet is an uninterested multicast group can comprise the network device comparing the multicast group address of a received packet against the multicast group addresses stored in the group validity table. If the incoming packet is for an interested group, the packet is processed and passed along to interested hosts. If the incoming traffic is for an uninterested group, the network device issues a leave message to the upstream router, and an entry is added to the group validity table for the uninterested multicast group with the Interested field set to No and the Timer field set to a specified value, in this example, 10 seconds. The uninterested packet is dropped by the network device. That is, the packet is not delivered to any downstream device, thus avoiding any unnecessary consumption of downstream network bandwidth.

After receipt of uninterested multicast traffic for multicast group 239.0.0.3, the group validity table could have the following contents:

| Group_Address | Interested | Timer |
|---|---|---|
| 239.0.0.1 | Yes | NA |
| 239.0.0.2 | Yes | NA |
| 239.0.0.3 | No | 10 |

After 10 seconds have passed, the timer associated with the unintended multicast group expires, the uninterested group entry is removed from the group validity table, and the group validity table looks as it did prior to receipt of the unintended multicast traffic:

| Group_Address | Interested | Timer |
|---|---|---|
| 239.0.0.1 | Yes | NA |
| 239.0.0.2 | Yes | NA |

Uninterested multicast traffic typically is not received by the network device once the leave message issued by the network device is received and processed by the upstream router. However, there can be some lag time before the leave message is processed by the router, or, the leave message sent by the network device may itself have been lost. Once the timer expires, any further additional unintended multicast traffic results in the process being repeated: a leave message is sent to the upstream router, an entry for the uninterested multicast group is added to the group validity table, and another countdown timer is started.

EXAMPLE 3

First Exemplary Method of Smart Leave Processing of Multicast Packets

Figure 3:
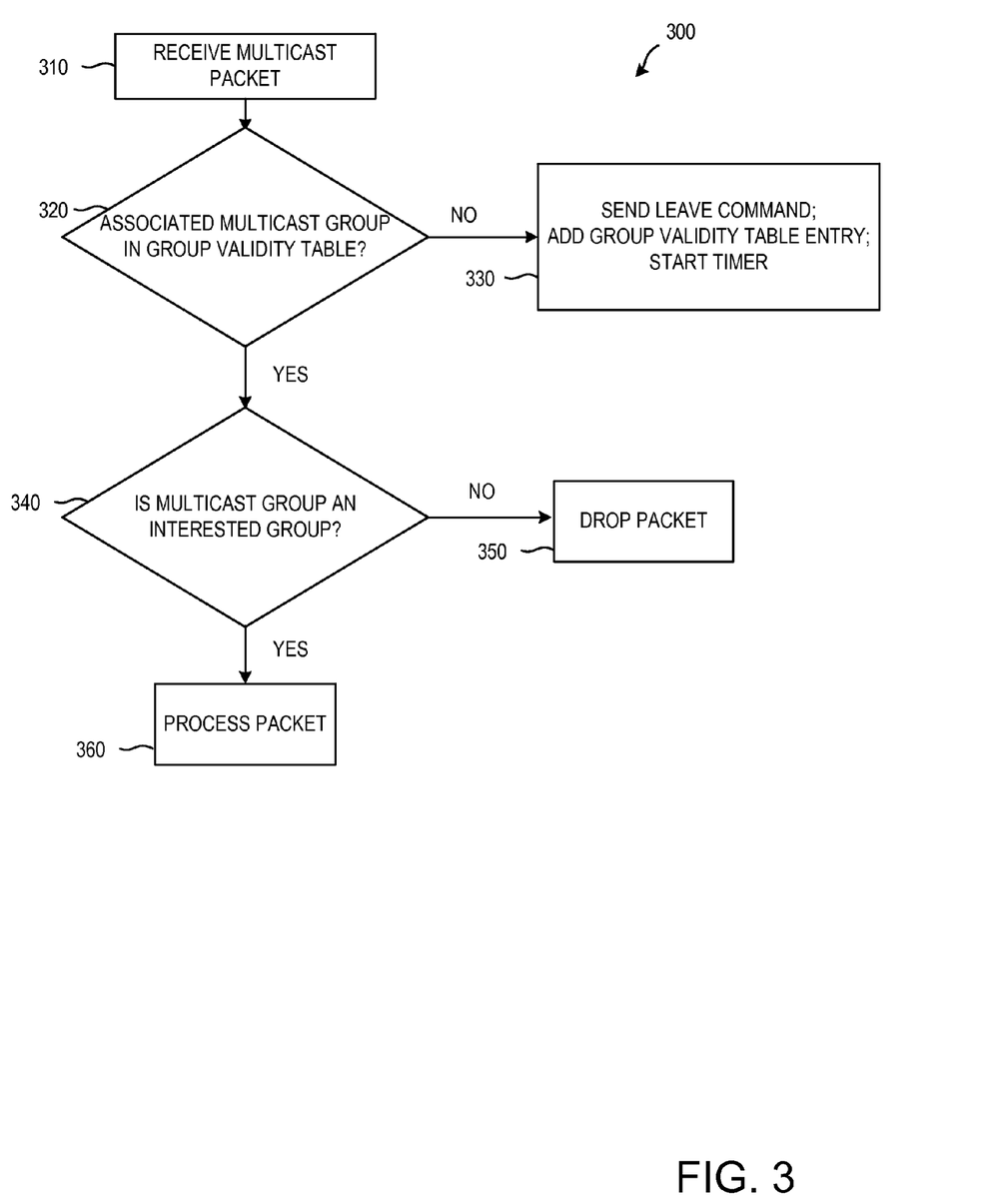
FIG. 3 is a flowchart of a first exemplary method of processing multicast packets at a network device.

FIG. 3 is a flowchart of a first exemplary method 300 of processing multicast packets. The method 300 can be performed by, for example, a network device configured to implemented the smart leave technologies described herein. The network device can be a residential gateway configured to maintain a group validity table as described herein.

At process block 310, a multicast packet is received.

At process block 320, it is determined whether the multicast group associated with the received packet has an associated entry in the group validity table. If not, at process block 330, a leave command is sent to an upstream router, an entry corresponding to the uninterested multicast group is added to the group validity table, and a countdown timer is started.

At process block 340, if the multicast group associated with the packet does have an associated entry in the table, it is determined whether the multicast group is an interested group. If not, the packet is dropped at process block 350. If the multicast group is an interested group, then the packet is processed at process block 360 and sent to interested downstream hosts.

EXAMPLE 4

Figure 4:
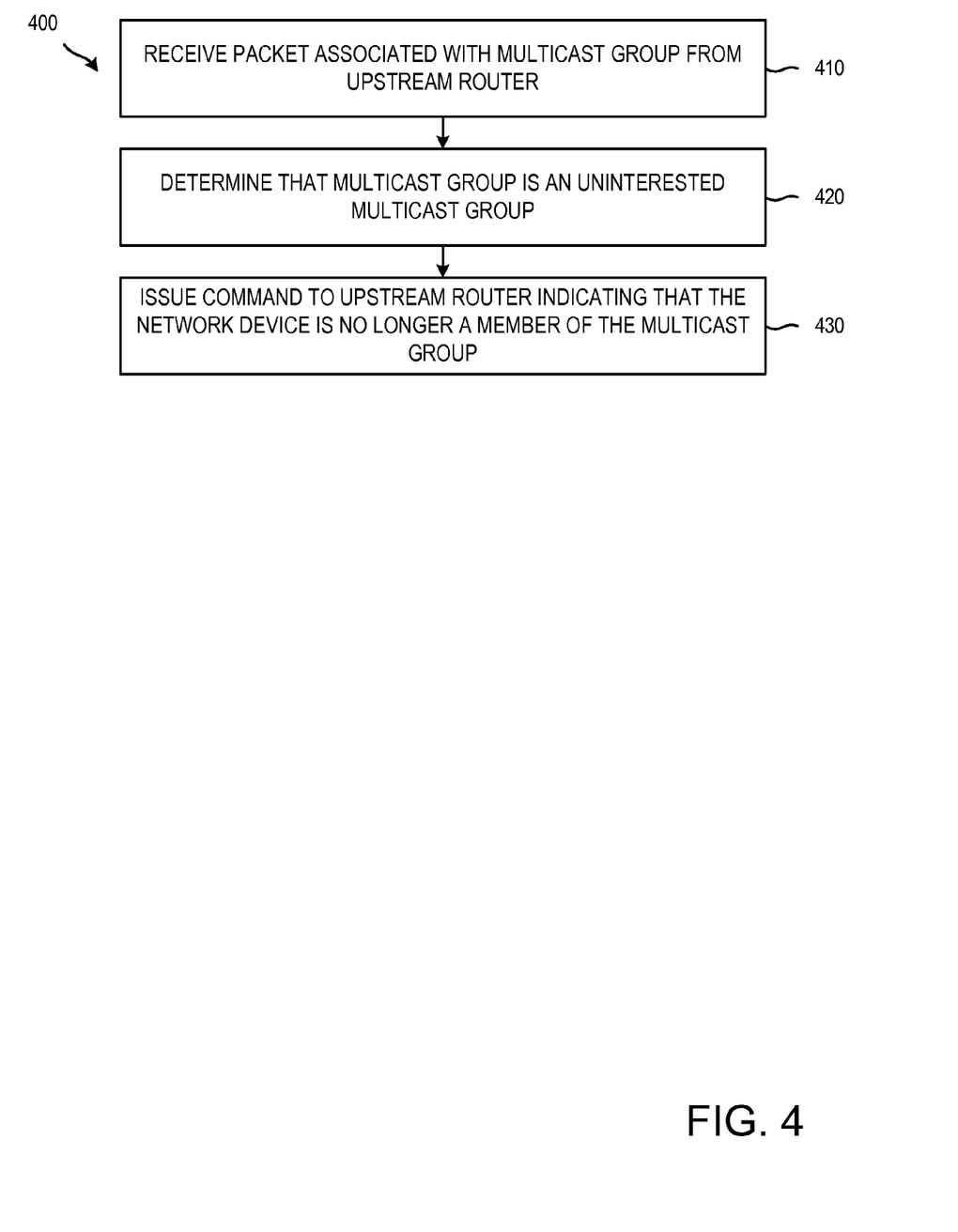
FIG. 4 is a flowchart of a second exemplary method of processing multicast packets at a network device.

Second Exemplary Method of Processing a Multicast Packet Using Smart Leave Technology FIG. 4 is a flowchart of a second exemplary method 400 of processing multicast packets at a network device. The method 400 can be performed by, for example, a wireless DSL modem/router in communication with several IPTV-enabled devices: a set top box connected to a television, a desktop computer a laptop computer.

At process block 410, a packet associated with a multicast group is received from an upstream router. In the example, the DSL modem receives a packet associated with an IPTV multicast group from an upstream router.

At process block 420, the multicast group is determined to be an uninterested multicast group. In the example, the DSL modem determines that the set top box, the laptop computer and the desktop computer are not members of the IPTV multicast group. For example, the DSL modem can determine that no downstream hosts are members of the multicast group by comparing the multicast group address against the multicast group addresses in a group validity table maintained by the DSL modem. The DSL may receive an uninterested multicast packet after a lost leave situation occurs.

At process block 430, a message is sent to the upstream router is issued indicating that the network device is no longer a member of the multicast group. In the example, the DSL modem sends a membership report to the upstream router containing addresses of multicast groups to which the DSL modem belongs, the addresses excluding the address of the uninterested multicast group.

The method 400 can contain additional tasks. In some embodiments, an additional packet associated with the multicast group is received at the network device from the upstream router. Continuing with the example, the DSL modem receives an additional packet associated with the IPTV multicast group. The additional packet is not delivered to any of the one or more host devices. In the example, the DSL modem drops the additional packet and the additional packet is not delivered to the set top box, the desktop computer or the laptop computer.

The method 400 can comprise further additional tasks. For example, the network device receives a join message from a joining host device downstream from the network device, the membership report indicating that the joining host device is to become a member of the multicast group. In the example, the DSL modem receives a membership report form the set top box indicating that the set top box is to join the multicast group. The network device then receives a further additional packet associated with the multicast group from the upstream router. In the example, the DSL modem receives an additional packet from the upstream router associated with the multicast group. The further additional packet is then delivered to the joining host device. In the example, the DSL modem delivers the further additional packet to the set top box.

EXAMPLE 5

Exemplary Implementation of Smart Leave Technologies

In some embodiments, a residential gateway can be configured to implement smart leave technologies described herein via configuration of a residential gateway. The residential gateway can be configured via software, firmware, hardware (e.g., via a network processor or other processor) or any combination thereof. Existing gateways can be reconfigured to implement smart leave technologies through a firmware and/or software upgrade of the gateway.

Smart leave technologies can be implemented in network devices other than residential gateways. For example, with reference to FIG. 1, smart leave technologies could be implemented in the DSLAM 150, or the switch 140. In embodiments employing cable television infrastructure, a cable modem termination system (CMTS), which provides functionality similar to that of a DSLAM, can be configured to implement smart leave technologies.

Smart leave technologies can be implemented in host devices as well, such as the set top boxes 170-171 in FIG. 1. For example, if, after sending a leave message informing an upstream router that the host wishes to leave a particular multicast group, the host device can send another leave command in response to receiving packets associated with the multicast group that the host has left. The host device can start a timer upon receipt of the first unintended multicast packet so as not to flood the network with leave commands. After expiration of the timer, the host can send another leave command if it continues to receive unintended multicast traffic.

Smart leave technologies are compatible with IGMPv3 and IGMPv2. Further, smart leave technologies can be implemented in the Multicast Listener Discovery (MLD) protocol, which handles multicast management in the Internet Protocol Version 6 (IPv6) suite.

Exemplary Advantages

The smart leave technologies disclosed herein have at least the following exemplary advantages. The smart leave technologies reduce network bandwidth consumed by unintended multicast traffic that can occur in a "lost leave" situation. If a host device leaves a first multicast group and joins a second multicast group, the link between the host device and upstream network device can become overloaded with intended second group traffic and unintended first group traffic. This can cause degradation of IPTV services delivered at the host device, resulting in missing pixels, a blank screen, or corrupted data. Without smart leave technologies, unintended multicast traffic can flow for several minutes (e.g., four minutes or more). With the smart leave technologies, the flow of unintended traffic can be reduced (e.g., on the order of seconds).

Further, smart leave technology can be implemented in firmware and/or software and thus do not require modifications to network device hardware. Network device firmware and software upgrades can be performed remotely by IPTV providers, thus reducing the costs of deploying smart leave technologies in an IPTV network.

Exemplary Computing Environment

The techniques and solutions described herein can be performed by firmware, software and/or hardware of a computing environment, such as a computing device. Exemplary computing devices include network devices (e.g., as routers, switches, DSLAMs, CMTSs), set top boxes, servers, desktop computers, laptop computers, notebook computers, netbooks, tablet devices, mobile devices, smartphones and other types of computing devices.

Figure 5:
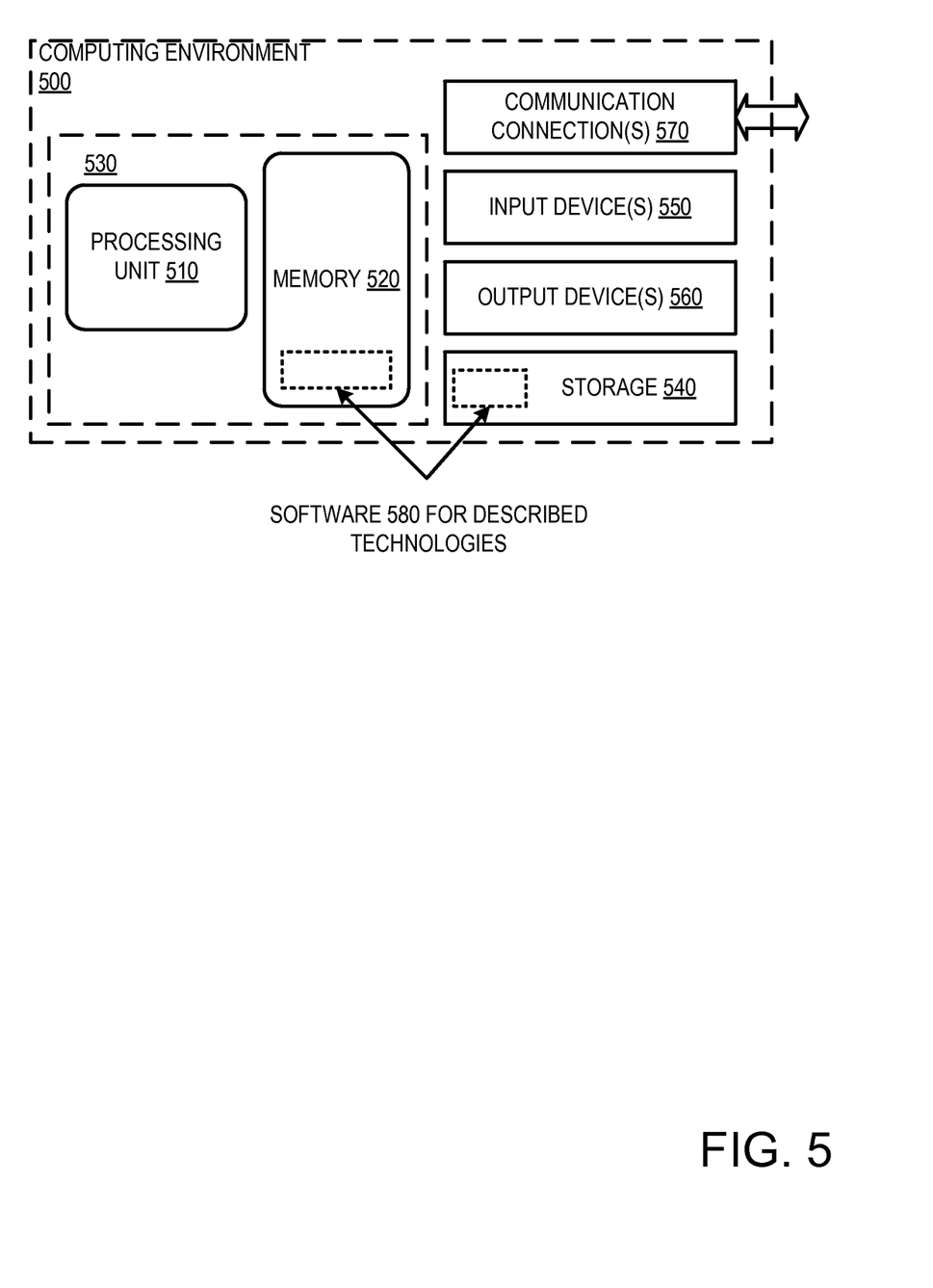
FIG. 5 illustrates a generalized example of a suitable computing environment in which described embodiments, techniques and technologies can be implemented.

FIG. 5 illustrates a generalized example of a suitable computing environment 500 in which described embodiments, techniques, and technologies can be implemented. The computing environment 500 is not intended to suggest any limitation as to scope of use or functionality of the technology, as the technology can be implemented in diverse general-purpose or special-purpose computing environments. For example, the disclosed technology can be implemented using one or more computing devices, respective of the computing devices comprising a processing unit, memory and storage storing computer-executable instructions implementing the technologies described herein. The disclosed technology can also be implemented with other computer system configurations, including multiprocessor systems, microprocessor-based or programmable consumer electronics, network PCs, minicomputers, mainframe computers, a collection of client/server systems and the like. The disclosed technology can also be practiced in distributed computing environments where tasks are performed by remote processing devices that are linked through a communications network, such as the Internet. In a distributed computing environment, program modules can be located in both local and remote memory storage devices.

With reference to FIG. 5, the computing environment 500 includes at least one central processing unit 510 and memory 520. In FIG. 5, this most basic configuration 530 is included within a dashed line. The central processing unit 510 executes computer-executable instructions. In a multi-processing system, multiple processing units execute computer-executable instructions to increase processing power and as such, multiple processors can be running simultaneously. The memory 520 can be volatile memory (e.g., registers, cache, RAM), nonvolatile memory (e.g., ROM, EEPROM, flash memory, etc.), or some combination of the two. The memory 520 stores software 580 that can, for example, implement the technologies described herein. A computing environment can have additional features. For example, the computing environment 500 includes storage 540, one or more input devices 550, one or more output devices 560 and one or more communication connections 570. An interconnection mechanism (not shown) such as a bus, a controller, or a network, interconnects the components of the computing environment 500. Typically, operating system software (not shown) provides an operating environment for other software executing in the computing environment 500, and coordinates activities of the components of the computing environment 500.

The storage 540 can be removable or non-removable, and includes magnetic disks, magnetic tapes or cassettes, CD-ROMs, CD-RWs, DVDs, or any other tangible storage medium which can be used to store information and which can be accessed within the computing environment 500. The storage 540 stores instructions for the software 580, which can implement technologies described herein.

The input device(s) 550 can be a touch input device, such as a keyboard, keypad, mouse, touchscreen, pen, or trackball, a voice input device, a scanning device, or another device, that provides input to the computing environment 500. For audio, the input device(s) 550 can be a sound card or similar device that accepts audio input in analog or digital form, or a CD-ROM reader that provides audio samples to the computing environment 500. The output device(s) 560 can be a display, printer, speaker, CD-writer, or another device that provides output from the computing environment 500.

The communication connection(s) 570 enable communication over a communication medium (e.g., a connecting network) to other computing entities. The communication medium conveys information such as computer-executable instructions, compressed graphics information or other data in a modulated data signal.

Cloud-Computing Environment

Figure 6:
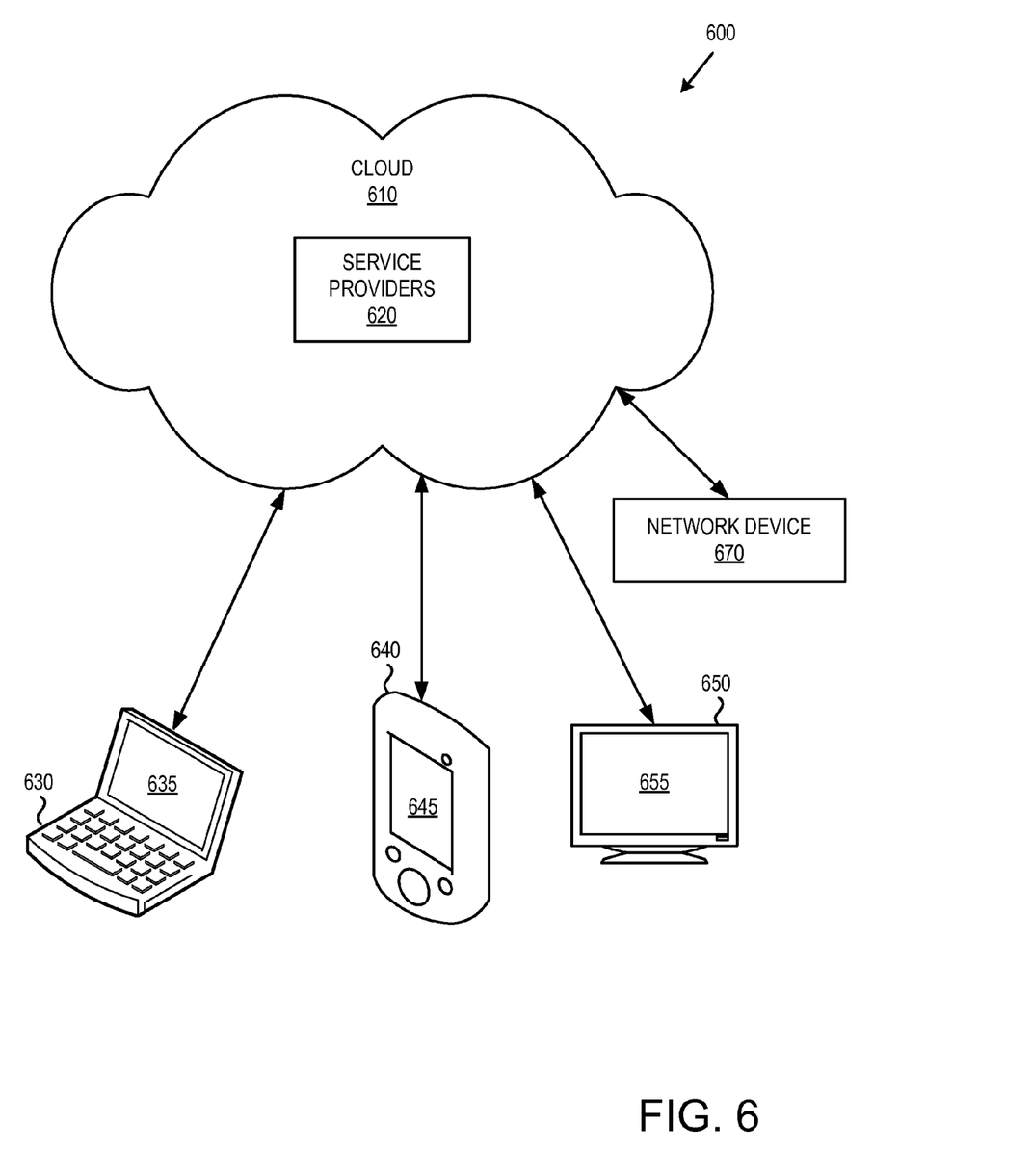
FIG. 6 illustrates a generalized example of a suitable implementation environment in which described embodiments, techniques, and technologies can be implemented.

The techniques and solutions described herein can be performed in a cloud-computing environment. FIG. 6 illustrates a generalized example of a suitable implementation environment 600 in which described embodiments, techniques, and technologies can be implemented.

In example environment 600, various types of services (e.g., computing services) are provided by a cloud 610. For example, the cloud 610 can comprise a collection of computing devices, which can be located centrally or distributed, that provide cloud-based services to various types of users and devices connected via a network such as the Internet. The implementation environment 600 can be used in different ways to accomplish computing tasks. For example, some tasks (e.g., processing user input, processing IPTV multicast packets, presenting a user interface, selecting eligible applicants or jobs) can be performed on local computing devices (e.g., connected devices 630, 640, 650) while other tasks (e.g., storage of data to be used in subsequent processing, ranking of eligible applicants and jobs) can be performed in the cloud 610.

In example environment 600, the cloud 610 provides services for connected devices 630, 640, 650 with a variety of screen capabilities. Connected device 630 represents a device with a computer screen (e.g., a mid-size screen 635). For example, connected device 630 could be a desktop, laptop, notebook, netbook or tablet computer or the like. Connected device 640 represents a mobile computing device with a mobile computing device screen 645 (e.g., a small-size screen). For example, connected device 640 could be a mobile phone, smartphone, personal digital assistant or the like. Connected device 650 represents a device with a large screen 655. For example, connected device 650 could be a television with Internet connectivity, or a television connected to another device capable of connecting to the cloud such as a set-top box, gaming console or the like. Devices without screen capabilities also can be used in example environment 600. For example, the cloud 610 can provide services for one or more network devices 670 (e.g., set top boxes, DSL modems, cable modems) without displays.

Services can be provided by the cloud 610 through service providers 620, or through other providers of online services (not depicted). For example, cloud services can be customized to the screen size, display capability, and/or touch screen capability of a particular connected device (e.g., connected devices 630, 640, 650). Services that can be provided by the service providers 620 include, for example, email, Short Message Service (SMS), Multimedia Message Service (MMS), social networking and website hosting. The service providers can host online marketplaces offering wide varieties of goods and services such as software applications and upgrades and media content which can be obtained by users with or without purchase and for download from the cloud or delivery through postal mail. Service providers provide storage for information such as the job information database, the applicant information database or the business resource database. Additional services can include the provision of IPTV services to the devices 630, 640 and 650, and the updating of firmware and/or software of the network device 670.

In example environment 600, the cloud 610 provides the technologies and solutions described herein to the various connected devices 630, 640, 650 using, at least in part, the service providers 620. For example, the service providers 620 can provide a centralized solution for various cloud-based services. The service providers 620 can manage service subscriptions for users and devices (e.g., for the connected devices 630, 640, 650 and their respective users).

Methods in Computer-Readable Media

Any of the disclosed methods can be implemented as computer-executable instructions or a computer program product. The computer-executable instructions or computer program products as well as any data created and used during implementation of the disclosed embodiments can be stored on one or more computer-readable storage media (e.g., non-transitory computer-readable storage media, such as one or more optical media discs (such as DVDs or CDs), volatile memory components (such as DRAM or SRAM), or nonvolatile memory components (such as flash memory or hard drives)) and executed on a computer (e.g., any commercially available computer, including desktops and laptops, or other computing devices that include computing hardware, such as network devices (e.g., routers, switches)). Computer-readable storage media does not include propagated signals. The computer-executable instructions can be part of, for example, firmware, dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are known in the art are omitted. For example, it is to be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, and infrared communications), electronic communications, or other such communication means.

DEFINITIONS

As used in this application and in the claims, the singular forms "a," "an," and "the" include the plural forms unless the context clearly dictates otherwise. Similarly, the word "or" is intended to include "and" unless the context clearly indicates otherwise. The term "comprising" means "including;" hence, "comprising A or B" means including A or B, as well as A and B together. Additionally, the term "includes" means "comprises."

Additionally, the description sometimes uses terms like "produce" and "provide" to describe the disclosed methods. These terms are high-level abstractions of the actual computer operations that are performed. The actual computer operations that correspond to these terms will vary depending on the particular implementation and are readily discernible by one of ordinary skill in the art.

Alternatives

The disclosed methods, apparatuses and systems should not be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Theories of operation, scientific principles or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation. In view of the many possible embodiments to which the principles of the illustrated embodiments may be applied, it should be recognized that the illustrated embodiments are only examples and should not be taken as limiting the scope of the disclosure. We claim all that comes within the scope of the appended claims.

We claim:

1. A method of processing multicast packets at a network device, the method comprising:
   storing, for a host device located downstream of the network device, a membership status entry for a multicast group in a membership status data store, the membership status entry indicating that the host device is a member of the multicast group;
   receiving a leave command for the multicast group from the host device;
   in response to receiving the leave command, updating the membership status data store in order to indicate that the host device is no longer a member of the multicast group and transmitting the leave command to an upstream router;
   after transmitting the leave command, receiving a packet associated with the multicast group from the upstream router;
   responsive to receiving the packet, consulting the membership status data store and determining that the host device is no longer a member of the multicast group;
   responsive to the determining, reissuing the leave command to the upstream router, dropping the received packet, and for a predefined time period since reissuing the leave command, dropping any additional received packets associated with the multicast group; and
   upon expiration of the predefined time period, removing the membership status entry for the multicast group from the membership status data store.

2. The method of claim 1, further comprising:
   receiving an additional packet associated with the multicast group at the network device from the upstream router during the predefined time period; and
   dropping the additional packet such that the additional packet is not delivered to the host device.

3. The method of claim 1, further comprising:
   receiving a join message from a joining downstream host device, the join message indicating that the joining downstream host device is to become a member of the multicast group;
   re-establishing a membership status entry for the multicast group in the membership status data store;
   receiving an additional packet associated with the multicast group from the upstream router; and
   delivering the additional packet to the joining host device.

4. The method of claim 1, further comprising:
   receiving an additional packet associated with the multicast group after expiration of the predefined time period; and
   reissuing the leave command again to the upstream router indicating that the network device is not a member of the multicast group, dropping the additional packet, and for a second predefined time period since reissuing the leave command again, dropping any additional received packets associated with the multicast group.

5. The method of claim 1, wherein the predefined time period is measured by starting a countdown timer.

6. The method of claim 1, wherein updating the membership data store in order to indicate that the host device is no longer a member of the multicast group comprises removing the membership status entry for the multicast group from the membership status data store, and wherein upon determining, responsive to receiving the packet, that the host device is no longer a member of the multicast group, re-establishing the membership status entry for the multicast group.

7. The method of claim 1, wherein reissuing the leave command comprises issuing a membership report.

8. The method of claim 1, wherein the leave command is an IGMP leave command.

9. The method of claim 1, wherein the packet comprises IPTV content.

10. The method of claim 1, wherein the method conforms with the Multicast Listener Discovery protocol.

11. The method of claim 1, wherein the network device is a residential gateway.

12. The method of claim 1, wherein the network device is a host device.

13. The method of claim 1, wherein the method is performed at layer 3 of the OSI model.

14. One or more non-transitory computer-readable media storing computer-executable instructions for handling multicast communications at a network device, the handling comprising:
   storing, in a membership status data store at the network device, a membership status entry for a multicast group for a host device located downstream of the network device, the membership status entry indicating that the host device is a member of the multicast group;
   receiving a leave command for the multicast group from the host device;
   in response to receiving the leave command, updating the membership status data store in order to indicate that the host device is no longer a member of the multicast group and transmitting the leave command to an upstream router;

after transmitting the leave command, receiving a packet associated with the multicast group at the network device from the upstream router;

responsive to receiving the packet, consulting the membership status data store and determining that the host device is no longer a member of the multicast group;

responsive to the determining, reissuing the leave command to the upstream router, dropping the received packet, and during a predefined time period since reissuing the leave command, dropping any additional received packets associated with the multicast group; and upon expiration of the predefined time period, removing the membership status entry for the multicast group from the membership status data store.

15. The one or more non-transitory computer-readable media of claim 14, wherein the handling further comprises:
receiving an additional packet associated with the multicast group at the network device from the upstream router during the predefined time period; and
not delivering the additional packet to the host device.

16. The one or more non-transitory computer-readable media of claim 15, further comprising:
receiving at the network device a join message from a joining host device downstream from the network device, the join message indicating that the joining host device is to join the multicast group;
re-establishing a membership status entry for the multicast group in the membership status data store;
receiving one or more further additional packets associated with the multicast group at the network device from the upstream router; and
delivering the one or more further additional packets to the joining host device.

17. A network device configured to:
store, for a host device located downstream of the network device, a membership status entry for a multicast group in a membership status data store, the membership status entry indicating that the host device is a member of the multicast group;
receive a leave command for the multicast group from the host device;
in response to receiving the leave command, update the membership status data store in order to indicate that the host device is no longer a member of the multicast group and transmit the leave command to an upstream router;
after transmitting the leave command, receive a packet associated with the multicast group from the upstream router;
responsive to receiving the packet, consult the membership status data store and determine that the host device is no longer a member of the multicast group;
responsive to the determining, reissue the leave command to the upstream router, drop the received packet, and during a predefined time period since reissuing the leave command, drop any additional received packets associated with the multicast group; and
upon expiration of the predefined time period, remove the membership status entry for the multicast group from the membership status data store.

18. The network device of claim 17, wherein the network device is further configured to:
receive an additional packet associated with the multicast group after expiration of the predefined time period; and
reissue the leave command again to the upstream router indicating that the network device is not a member of the multicast group, dropping the additional packet, and during a second predefined time period since reissuing the leave command again, dropping any additional received packets associated with the multicast group.

19. The network device of claim 17, wherein the network device is further configured to:
receive an additional packet associated with the multicast group from the upstream router during the predefined time period; and
not deliver the additional packet to the host device.

20. The network device of claim 17, wherein the network device is further configured to:
receive a join message from a joining host device downstream from the network device, the join message indicating that the joining host device is to join the multicast group;
re-establish a membership status entry for the multicast group in the membership status data store;
receive an additional packet associated with the multicast group at the network device from the upstream router; and
deliver the additional packet to the joining host device.

* * * * *